May 17, 1960  H. E. KOCH  2,936,501
FASTENING DEVICE
Filed Oct. 13, 1954  2 Sheets-Sheet 1
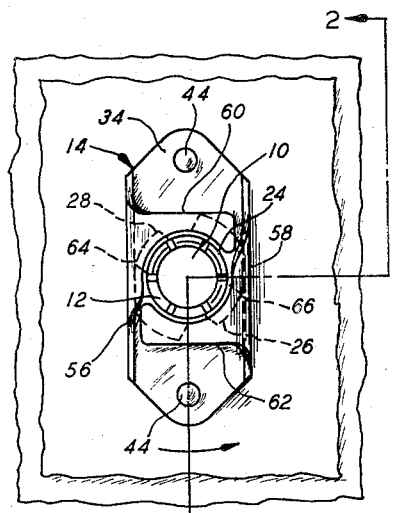
Fig. 1
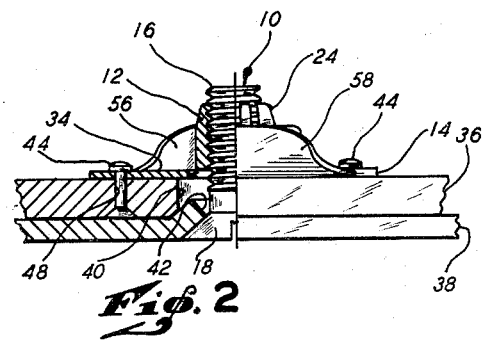
Fig. 2
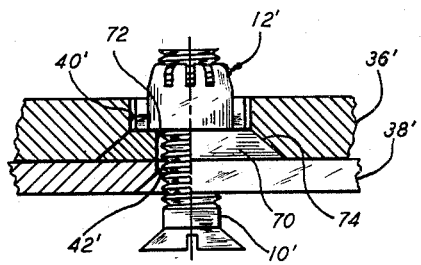
Fig. 8
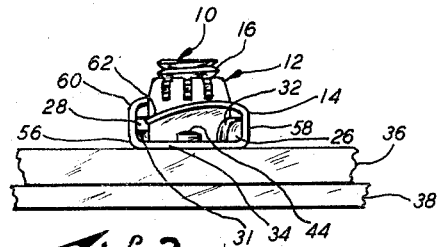
Fig. 3
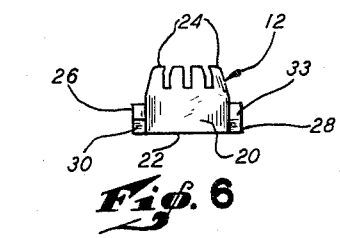
Fig. 6
Fig. 4
Fig. 5
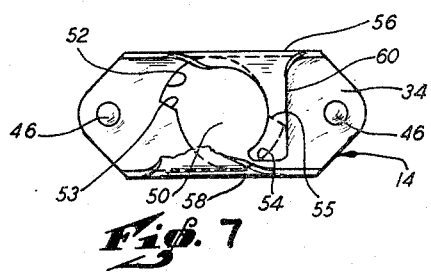
Fig. 7
INVENTOR.
HAROLD E. KOCH
BY Richard A. Craig
HIS ATTORNEY May 17, 1960 H. E. KOCH 2,936,501
FASTENING DEVICE
Filed Oct. 13, 1954 2 Sheets-Sheet 2

INVENTOR.
HAROLD E. KOCH
BY Richard A. Craig
HIS ATTORNEY

United States Patent Office 2,936,501
Patented May 17, 1960

2,936,501
FASTENING DEVICE
Harold E. Koch, Lindenhurst, N.Y.
Application October 13, 1954, Serial No. 461,992
10 Claims. (Cl. 24—221)

This invention relates to fastening devices and more particularly to that type of device commonly called a quick release or quick disconnect fastener.

Such a device is used for securing a primary structure to a secondary structure in the form of overlapping plates having aligned holes therethrough. These structures will be referred to hereinafter as the inner member and the outer member, respectively.

A device in accordance with this invention is an improvement over that of U.S. Patent No. 2,095,271, granted October 12, 1937, to C. A. Swanstrom.

Among the desirable features which should be possessed by a quick release fastener are the following:

(a) The members should be positively held together;

(b) Adequate tension load carrying properties should be developed;

(c) Adequate shear load carrying properties should be developed;

(d) When unlocked the fastener should automatically provide indication of that fact visible from the outer surface of the outer member;

(e) When the fastener is locked no part thereof should extend outwardly from the outer surface of the outer member;

(f) When the fastener is unlocked all parts thereof should be carried by either the inner or outer member;

(g) The members should be quickly and easily attached and detached;

(h) The fastener should be such that the members cannot become accidentally detached;

(i) The fastener should be such that it will pull the inner and outer members together before it becomes locked; and (j) The fastener should be of simple, inexpensive construction.

None of the many quick release fasteners of the prior art possessed all of the above features.

Therefore important objects of this invention are to provide a quick release fastener possessing all of the above features.

Briefly, one illustrated example of a fastener in accordance with this invention comprises a bolt having a shank adapted to pass through the aligned holes in the inner and outer members, a self-locking nut adapted for threaded engagement with the bolt and having lugs, and a retainer having an apertured base adapted to be attached to the inner member with the aperture aligned with the hole through the inner member, the nut being shaped to pass freely through the hole through the inner member but not through the hole through the outer member, the aperture being shaped so that the nut can pass therethrough when in a limited number of positions only, the retainer having abutments to limit rotation of the nut after it has entered the retainer through the aperture and resilient fingers positioned to be flexed by the lugs before the nut can pass through the aperture in either direction.

The above and other objects and advantages will become apparent from the following description and the accompanying drawings in which:

Fig. 1 is a plan view of a preferred fastener embodying the invention, the device being shown locking an inner member and an outer member together;

Fig. 2 is a view taken on line 2—2 of Fig. 1;

Fig. 3 is an end view of what is shown in Fig. 1;

Fig. 4 is an end view of what is shown in Fig. 1 but with the fastener unlocked;

Figs. 5 and 6 are two views of the nut of the fastener;

Fig. 7 is a plan view partly broken away of the retainer of the fastener;

Fig. 8 is a view partly in section of a slightly modified form of the fastener of Figs. 1 through 7;

Figure 12:
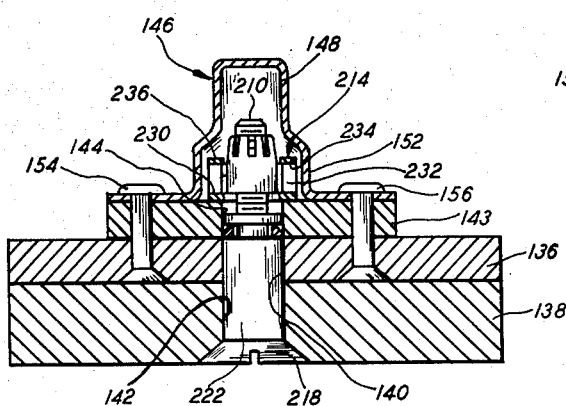
Fig. 12 is a view taken on line 12—12 of Fig. 11.

Reference is first made particularly to the device illustrated in Figs. 1 through 7 wherein is shown a quick release fastener comprising a bolt 10, a nut 12 and a retainer 14.

Bolt 10 is of the ordinary type having a threaded shank 16 and a flat head 18 slotted for engagement by a tool to turn bolt 10.

Nut 12 includes a body 20 having a bottom surface 22 at one end, a plurality (six as shown) of beams 24 and two opposed lugs 26 and 28 extending radially from body 20 and having their bottom surfaces contiguous with surface 22. Nut 12 is internally threaded throughout body 20 and beams 24 for threaded engagement with shank 16 of bolt 10. Beams 24 are offset toward the thread axis so that as shank 16 traverses the length of beams 24 the beams will be displaced outwardly to set up a restoring force therein frictionally engaging the thread of shank 16 to render nut 12 self-locking. As will appear more clearly hereinafter, nut 12 must be self-locking so that it will positively turn with bolt 10 unless prevented from doing so by outside means.

The self-locking feature may be achieved in other ways, the illustrated beams being merely a well known example of a suitable way of achieving the self-locking feature.

As shown most clearly in Fig. 5 lug 26 is provided with a bevelled surface 30 at its lower righthand edge as viewed in Fig. 5 and a rounded surface 32 at its upper lefthand edge. Lug 28 is shaped identically, having bevelled surface 31 and rounded surface 33.

Retainer 14 is of resilient sheet metal of uniform thickness and includes a base 34 shaped to conform to the contour of an inner member 36 which is to be fastened by the device to an overlapping outer member 38. As shown members 36 and 38 are flat plates, but it should be understood that they may assume other forms. Members 36 and 38 have circular holes 40 and 42 (Fig. 2) therethrough, respectively, which are in alignment when the members are in position to be joined by the device.

Retainer base 34 is adapted to be permanently and directly attached to the inner surface of inner member 36 as by rivets 44 through holes 46 (Fig. 7) through base 34 and aligned holes 48, of which only one is visible in Fig. 2 through member 36.

Retainer base 34 is provided with an aperture 50 therethrough which is adapted to be in alignment with hole 40 through member 36 when base 34 is attached to member 36 as aforesaid. Aperture 50 is of a particular configuration generally oval in shape with opposed recesses 52 and 54 adjacent the ends of the oval as best shown in Fig. 7. Recesses 52 and 54 are partially defined by edges 53 and 55, respectively.

Retainer 14 also includes parallel side walls 56 and 58 at substantially right angles to base 34 and integral therewith and joining base 34 also at the ends of the oval.

Retainer 14 further includes fingers 60 and 62 integral with and at the tops of walls 56 and 58, respectively. Fingers 60 and 62 overlie base 34 and are bent generally downward from their points of merger with walls 56 and 58 to their free ends which are located substantially directly above the centers of recesses 54 and 52, respectively. When unflexed, the ends of fingers 60 and 62 are located above retainer base 34 a distance less than the height of nut lugs 26 and 28.

Hole 42 through member 38 is too small to permit nut 12 to pass therethrough, hole 40 through member 36 is large enough to permit nut 12 to pass therethrough when in any position of rotation, and aperture 50 is shaped so that nut 12 can pass therethrough, but only when lugs 26 and 28 are aligned with recesses 52 and 54.

As shown in Fig. 2 hole 40 is countersunk at its outer end and the periphery of hole 42 is indented to conform to and engage the countersunk portion of hole 40. Head 18 of bolt 10 is shaped and dimensioned on the side thereof toward shank 16 to conform to and engage the outer surface of the indentation with the other side of head 18 flush with the outer surface of member 38.

To prepare members 36 and 38 for connection by means of the device, bolt shank 16 is passed through hole 42 with bolt head 18 positioned to engage the indentation, and nut 12 is threaded onto shank 16 with surface 22 facing head 18; and retainer base 34 is attached to the inner surface of member 36 as aforesaid. Members 36 and 38 are then placed with holes 40 and 42 aligned and the indented periphery of hole 42 engaging the countersunk portion of member 36.

To complete the connection, bolt 10 is turned, preferably in the direction indicated by the arrow in Fig. 1, until lugs 26 and 28 are positioned to pass through recesses 52 and 54. At this time nut 12 will be positioned to enter retainer 14 through aperture 50, and the tops of lugs 26 and 28 will engage the ends of fingers 60 and 62. In short, the parts will be positioned as shown in Fig. 4. Continued turning of bolt 10 in the direction of the arrow in Fig. 1 will cause bevelled lug surfaces 30 and 31 to contact and then ride up on edges 53 and 55 of recesses 52 and 54 in a camming action urging members 36 and 38 together, at the same time flexing fingers 60 and 62 away from retainer base 34, until the bottom surfaces of lugs 26 and 28 are completely on retainer base 34. At this time nut 12 will have completely entered retainer 14. Continued turning of bolt 10 will cause the bottom surface of lugs 26 and 28 to slide directly on base 34 until lugs 26 and 28 contact walls 58 and 56, respectively, as shown at 64 and 66 in Fig. 1. During all of the above nut 12 rotates as a unit with bolt 10 due to the self-locking action of beams 24. However, additional rotation of nut 12 is prevented when lugs 26 and 28 contact walls 56 and 58, which act as abutments. A slight additional rotation of bolt 10 will then cause bolt 10 to advance with respect to nut 12 to clamp members 36 and 38 together.

Before contacting walls 56 and 58, lugs 26 and 28 leave fingers 60 and 62 permitting them to return to their normal unstressed positions.

The rotation of nut 12 from the time the upper surfaces of lugs 26 and 28 first contact fingers 60 and 62 until the connection is completed is approximately 90 degrees.

For initial installation it may be more convenient to modify the method of preparation described above by installing retainer 14 with nut 12 therein, attaching retainer base 34 to member 36, placing member 38 with the indentation engaging the countersunk portion of member 36, and then placing bolt 10 to engage nut 12. This has the advantage that retainer 14 and nut 12 can be previously assembled, leaving only bolt 10 to be handled during assembly. This may be particularly important where member 38 is so large that one man cannot get on both sides of hole 42 to effect the connection of bolt 10 and nut 12. The procedure described in this paragraph is facilitated by the fact that nut 12 can "float" relative to retainer 14, thus making it easier for bolt 10 to "find" nut 12.

To detach members 36 and 38 bolt 10 is turned in the opposite direction, the first slight rotation loosening the clamping action of nut 12 against retainer base 14, and additional turning causing nut 12 to turn as a unit with bolt 10 with the bottom surfaces of lugs 26 and 28 sliding in the reverse direction back toward recesses 52 and 54. Before reaching recesses 52 and 54 the curved upper lug surfaces 32 and 33 engage fingers 60 and 62 once more flexing them away from retainer base 34 until lugs 26 and 28 are directly over recesses 52 and 54 and nut 12 is in position to leave retainer 14 through aperture 50. At this time the restoring force set up in fingers 60 and 62 by the flexure will force nut 12 through aperture 50 to detach the parts.

Regardless of how tight the operator has previously turned bolt 10 when connecting members 36 and 38, it is necessary to turn bolt 10 only about 90 degrees to detach the parts.

The connection as described above is quickly and easily made, and may be just as quickly and easily broken, merely by turning bolt 10 about a quarter turn as aforesaid.

Tension load is carried by nut lugs 26 and 28 bearing directly on retainer base 34 which in turn bears directly on inner member 36. Thus there is nothing to buckle or otherwise fail under tension.

Shear load is carried by the engagement of the indented periphery of hole 42 and the countersunk portion of inner member 36. Because the members are held tightly together a high shear load can thereby be carried.

Bolt head 18 lying flush with the outer surface of outer member 38 when the device is in the locked position, no part thereof extends outwardly from the outer surface of member 38.

When the device is unlocked, bolt 10 and nut 12 are carried by member 38 while retainer 14 is carried by member 36.

The fact that fingers 60 and 62 must be flexed in order for the device to pass from its locked to its unlocked position means that in the event that the operator fails to tighten bolt 10 after nut 12 enters retainer 14, fingers 60 and 62 will prevent the device from becoming accidentally unlocked under vibration.

When members 36 and 38 are held together by a pluraity of fasteners it is important to be able to tell at a glance which ones are locked and which are unlocked. If locked, bolt head 18 will be flush with the outer surface of member 38. If unlocked, bolt head 18 will be maintained by fingers 60 and 62 extending from the outer surface of member 38, as shown in Fig. 4.

Thus fingers 60 and 62 perform a double function. First, they prevent the device from accidentally becoming unlocked, and second, they provide visible indication when the device is unlocked.

Bevelled lug surfaces 30 and 31 cause the device to draw members 36 and 38 together before the fastener is fully locked.

Where the thickness of the outer member is too great to be indented as shown in Fig. 2 (about 0.091 inch in the case of aluminum alloy), other means of carrying shear load must be provided.

Fig. 8 illustrates a modification of the device to accommodate such a condition. The modification includes a bolt 10', a nut 12' and a retainer which for clarity is not shown in Fig. 8, these parts being similar to bolt 10, nut 12 and retainer 14. Also shown in Fig. 8 are an inner member 36' and an outer member 38' which are similar to members 36 and 38 except that member 38' is too thick to be indented. Member 36' has a countersunk hole 40' therethrough, through which nut 12' can freely pass, and member 38' has a hole 42' therethrough, through nut 12' cannot pass, hole 42' being countersunk to receive the head of bolt 10' flush with the outer surface of member 38'. The modification also includes a bushing 70 having a hole 72 through which nut 12' cannot pass and which may conveniently be of the same diameter as the cylindrical portion of hole 42' and a bevelled surface 74 adapted for snug fit with the countersunk portion of hole 40'.

Like bolt 10' and nut 12', bushing 70 is adapted to be carried by outer member 38', and is assembled on bolt 10' between nut 12' and the inner surface of member 38'.

Thus when nut 12' enters the retainer and the connection is made, bushing surface 74 bears against the countersunk portion of hole 40'. Since the device does not deflect under tension load, shear load is carried through member 38' to bolt 10', which bears on bushing 70 to transfer the shear load to member 36' via the countersunk portion of hole 40'.

Figure 9:
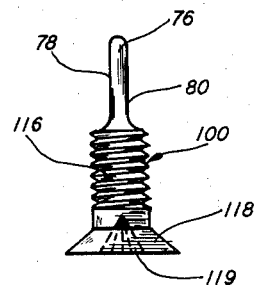
Fig. 9 is a view of a modified form of one of the components of the fastener shown in either Figs. 1 through 7 or Fig. 8.
Figure 10:
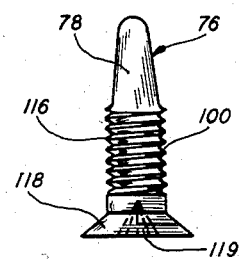
Fig. 10 is a view of the component of Fig. 9 but taken at right angles thereto.

In certain applications of the invention it will happen that it is desirable or necessary that the fastener be operated from the inner surface of the inner member rather than from the outer surface of the outer member. In Figs. 9 and 10 there is illustrated a modified form of bolt 100 having a threaded shank 116 and a head 118 which as shown is provided with a slot 119, but the slot is necessary only where the fastener is to be operated from either side of the members. Integral with shank 116 and at the end thereof remote from head 118 is an extension 76 which has two parallel surfaces 78 and 80 separated by a distance less than the diameter of shank 116 and convenient to be gripped by a tool such as a pair of pliers. Surfaces 78 and 80 are identically shaped and are widest where shank 116 and extension 76 meet and narrowest at the other end of extension 76.

When bolt 100 is used in place of bolt 10 or 10', and the parts are positioned to be joined by the device, extension 76 will lie on the inside of the inner member free of the remainder of the fastener so that it may be gripped by a pair of pliers to turn bolt 100 to effect the locking of the fastener as before. Bolt 100 may also be turned in the other direction to unlock the fastener.

Figure 11:
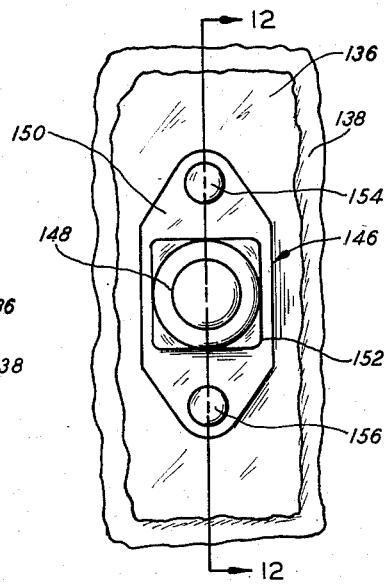
Fig. 11 is a plan view of another modification of the invention.
Figure 13:
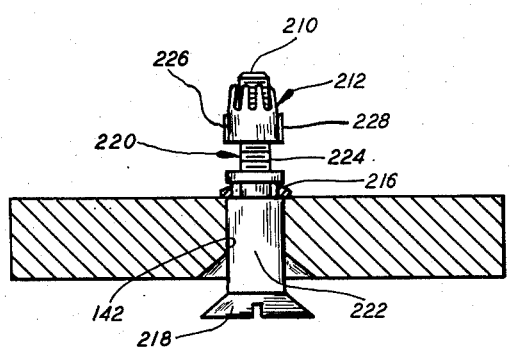
Fig. 13 is a view similar to Fig. 12 but with some of the parts removed and others in different positions.

In Figs. 11 through 13 there is shown another modification of the invention which is of particular use where the inner and outer members have no curvature, where the holes therethrough are of the same diameter and where it is required to prevent fluid pressure from passing through the holes. The fastener of these views is thus adapted for use in joining inner and outer members 136 and 138, respectively, members 136 and 138 having cylindrical holes 140 and 142 of the same diameter therethrough, respectively, which are to be aligned when members 136 and 138 are positioned to be joined. Hole 142 is countersunk at the end thereof at the outer surface of member 138.

Mounted on the inner surface of member 136 is a shim 143 having a cylindrical hole 144 therethrough, hole 144 being of the same diameter as holes 140 and 142 and aligned therewith. Mounted on the inner surface of shim 143 is a pressure cap 146 having a body 148 closed at the top and open at the bottom, the opening being aligned with shim hole 144. Cap 146 also has a base 150 which bears against the inner surface of shim 143. For reasons which will shortly appear, the cap opening is of square shape at the part thereof designated 152 where body 148 joins base 150.

Shim 143 and cap 146 are attached to member 136 as by rivets 154 and 156 passing through aligned holes through these parts.

The fastener of the modification shown in Figs. 11 through 13 also includes a bolt 210, a nut 212, a retainer 214 and a bevelled snap ring 216.

Bolt 210 has a head 218 adapted for fit in the countersunk portion of hole 142, and a shank 220 comprising an unthreaded portion 222 adjacent to head 218 and of diameter adapted for snug fit in holes 142, 140 and 144. Just toward head 218 from the end of unthreaded portion 222 remote from head 218 is an annular recess around shank 220, the purpose of which will shortly appear. The total axial length of head 218 and the part of portion 222 between head 218 and the recess is as shown equal to the total thickness of members 136 and 138.

Shank 220 also includes a threaded portion 224 at the end of shank 220 remote from head 218. The diameter of portion 224 is substantially less than that of holes 140, 142 and 144. The total length of bolt 210 is less than the distance from the outer surface of member 138 to the inside of the closed end of cap 146.

Nut 212 is again of the self-locking type, and as shown the self-locking feature is again achieved by means of beams. Nut 212 again has two opposed lugs 226 and 228, the distance between the ends of which is less than the diameter of holes 140 and 144 so that nut 212 can pass therethrough.

Retainer 214 is of spring metal and is similar to retainer 14, having an apertured base 230, the aperture being shaped to permit nut 212 to pass therethrough when in a limited number of positions only, two parallel side portions perpendicular to and integral with base 230, of which only one, numbered 232, is visible, and spring fingers 234 and 236 integral with the tops of the side portions and having portions overlying those parts of the aperture through which lugs 226 and 228 can pass, to be flexed thereby as nut 212 passes through the aperture in either direction. The difference between retainers 14 and 214 is that the latter has no end portions for mounting the retainer, so that retainer 214 has a substantially square shape.

Thus, as shown, retainer 214 lies loosely within square portion 152 of the opening in cap 146 with base 230 confronting the inner surface of shim 143 and has a predetermined amount of "float" with respect to shim 143. Thus too retainer 214 is prevented from turning in cap 146 by virtue of the fact that retainer 124 and cap portion 152 are both of square shape.

Bevelled snap ring 216, which lies normally partly in the annular recess in shank portion 222, has a normal outside diameter greater than that of hole 144 and a radial thickness which is less than the depth of the recess.

Bolt 210, nut 212 and ring 216 are assembled with member 138 by passing shank portion 222 through hole 142 with head 218 on the side of member 138 having the countersunk portion of hole 142 and the recess on the other side, installing ring 216 in the recess with the bevelled surface facing away from head 218 and threading nut 212 onto threaded shank portion 224. These parts are then as shown in Fig. 13.

To effect the locking of the device, members 136 and 138 are brought together with holes 140 and 142 aligned, with nut 212 largely in hole 144 and probably with the tops of lugs 226 and 228 bearing on the bottom of retainer base 144, bolt 210 is rotated in the direction tending to advance bolt 210 relative to nut 212 until nut 212 passes through the retainer aperture and lugs 226 and 228 engage and flex fingers 234 and 236 away from base 144. Further rotation of bolt 210 will cause nut 212 to rotate with the bottoms of lugs 226 and 228 sliding on base 144 until the lugs engage the retainer side portions and additional rotation of bolt 210 will cause it to advance relative to nut 212 securely to clamp members 136 and 138 together. As is the case with other modifications, after nut 212 passes through the retainer aperture, locking is effected by rotating bolt 210 only approximately ninety degrees. The parts are then as shown in Fig. 12.

To unlock the fastener of Figs. 11 through 13 it is necessary merely to rotate bolt 210 about ninety degrees in the opposite direction to position nut 212 to pass through the retainer aperture in the other direction.

There remains to be mentioned the action of ring 216. As shown in Fig. 13, ring 216 when unstressed extends outwardly of shank portion 222 to overlap the inner surface of member 138, thus to prevent bolt 210 and nut 212 from becoming separated from member 138. When members 136 and 138 are brought together as aforesaid, the bevelled surface of ring 216 engages the outer end of hole 140 which compresses ring 216 completely into its recess as shown in Fig. 12. When the members are separated ring 216 immediately expands again to its unstressed or normal position.

In the modification shown in Figs. 11 through 13, shear load is transmitted from member 136 to unthreaded bolt shank portion 222 and thence to member 138.

The purpose of shim 143 is to achieve full bearing between portion 222 and hole 140 for maximum shear load carrying strength, and therefore sometimes shim 143 can be omitted. In that event, cap base 150 and retainer base 230 will contact the inner surface of member 136 directly, and the unthreaded portion of the bolt shank will be shortened to place the recess in hole 140 when members 136 and 138 are fastened together.

Also, sometimes it will be desirable to omit cap 146, in which case the retainer may be identical with retainer 14 and be attached either to shim 143 or directly to the inner surface of member 138. If cap 146 is omitted, the bolt may be provided with an extension as shown at 76 in Figs. 9 and 10 so that the fastener can be worked from the inner surface of member 136.

From the foregoing it will be evident that the invention may be embodied in many different specific forms and it is accordingly to be understood as embracing all structures falling within the scope of the appended claims.

I claim:

1. A quick release fastener for securing an inner member having first and second surfaces and an inner hole therethrough to an outer member having third and fourth surfaces and an outer hole therethrough, comprising a bolt having a head and a shank, a self-locking nut having opposed lugs and adapted to pass through said inner hole, said nut and said bolt being adapted to be threadedly assembled with said shank passing through said outer hole and said nut and said head on the sides of said outer member having said third and fourth surfaces respectively, and a retainer of resilient sheet metal including a substantially flat base having an aperture therethrough, said retainer being adapted to be assembled on said inner member on the side thereof having said first surface with said aperture aligned with said inner hole, parallel side portions integral with and perpendicular to said base and spaced apart a distance less than the distance between opposite ends of said lugs, said aperture being shaped to permit said nut to pass therethrough when in a limited number of positions only, and fingers integral with said side portions and having portions overlying those parts of said aperture through which said lugs can pass and spaced from said base a distance less than the height of said lugs, so that by rotating said bolt with the parts assembled as aforesaid and with said second and third surfaces engaging each other with said nut in said inner hole, said nut will pass through said aperture flexing said fingers away from said base and will then rotate with said lugs sliding on said base until said lugs engage said side portions and then said bolt will advance relative to said nut securely to clamp said members together.

2. A quick release fastener for securing an inner member having first and second surfaces and an inner hole therethrough to an outer member having third and fourth surfaces and an outer hole therethrough, comprising a bolt having a head and a shank, a self-locking nut having opposed lugs and adapted to pass through said inner hole but not said outer hole, said nut and said bolt being adapted to be threadedly assembled with said shank passing through said outer hole and said nut and said head on the sides of said outer member having said third and fourth surfaces respectively, and a retainer of resilient metal including a substantially flat base having an aperture therethrough, said retainer being adapted to be assembled with said inner member with said base attached directly to said first surface with said aperture aligned with said inner hole, parallel side portions integral with and perpendicular to said base and spaced apart a distance less than the distance between opposite ends of said lugs, said aperture being shaped to permit said nut to pass therethrough when in a limited number of positions only, and fingers integral with said side portions and having portions positioned to be flexed away from said base by said lugs when said nut passes through said aperture, so that by rotating said volt with the parts assembled as aforesaid and with said second and third surfaces engaging each other with said nut in said inner hole, said nut will pass through said aperture and will then rotate with said lugs sliding on said base until said lugs engage said side portions and then said bolt will advance relative to said nut securely to clamp said members together.

3. A quick release fastener for securing an inner member to an outer member, said members having first and second aligned holes therethrough, respectively, said fastener comprising a bolt having a shank adapted to pass through said holes, a self-locking nut adapted for threaded engagement with said shank, said nut having lateral lugs having free ends and being adapted to pass through said first hole, said lugs being provided with cam surfaces, and a one piece metallic retainer having an apertured base adapted to be assembled with said inner member with said aperture aligned with said first hole, said aperture being shaped so that said nut can pass therethrough when in a limited number of positions only, said retainer having parallel side walls and resilient fingers on the side walls spaced from and directed toward said base and having portions overlying those parts of said aperture through which said lugs can pass and to be flexed by said lugs as said nut enters said retainer through said aperture, said side walls having portions engageable by said lugs spaced from each other a distance less than the distance between said free ends of the lugs, so that when said nut is in position to pass through said aperture with said lugs engaging but not flexing said fingers, upon turning said bolt said cam surfaces will engage said base and further turning will cause said nut fully to enter said retainer simultaneously flexing said fingers and said lugs to engage said portions of said side walls.

4. For use as a component of a quick release fastener for securing an inner member to an outer member, said members having first and second aligned holes therethrough, respectively, said fastener including a bolt having a shank adapted to pass through said holes and a self-locking nut adapted for threaded engagement with said shank, said nut having lateral lugs having free ends and being adapted to pass through said first hole, said lugs being provided with cam surfaces: a one piece metallic retainer having an apertured base adapted to be assembled with said inner member with said aperture aligned with said first hole, said aperture being shaped so that said nut can pass therethrough when in a limited number of positions only, said retainer having parallel side walls and resilient fingers on the side walls spaced from and directed toward said base and having portions overlying those parts of said aperture through which said lugs can pass and to be flexed by said lugs as said nut enters said retainer through said aperture, said side walls having portions engageable by said lugs spaced from each other a distance less than the distance between said free ends of said lugs, so that when said nut is in position to pass through said aperture with said lugs engaging but not flexing said fingers, upon turning said bolt said cam surfaces will engage said retainer base and further turning will cause said nut fully to enter said retainer simultaneously flexing said fingers and said lugs to engage said portions of said side walls.

5. For use as components of a quick release fastener for securing an inner member to an outer member, said members having first and second aligned holes therethrough, respectively, said fastener including a bolt having a shank adapted to pass through said holes: a self-locking nut adapted for threaded engagement with said shank, said nut having lateral lugs having free ends and being adapted to pass through said first hole, said lugs being provided with cam surfaces; and a one piece metallic retainer having an apertured base adapted to be assembled with said inner member with said aperture aligned with said first hole, said aperture being shaped so that said nut can pass therethrough when in a limited number of positions only, said retainer having parallel side walls and resilient fingers on the side walls spaced from and directed toward said base and having portions overlying those parts of said aperture through which said lugs can pass and to be flexed by said lugs as said nut enters said retainer through said aperture, said side walls having portions engageable by said lugs spaced from each other a distance less than the distance between said free ends of the lugs, so that when said nut is in position to pass through said aperture with said lugs engaging but not flexing said fingers, upon turning said bolt said cam surfaces will engage said retainer base and further turning will cause said nut fully to enter said retainer simultaneously flexing said fingers and said lugs to engage said portions of said side walls.

6. The invention set forth in claim 3 wherein said inner member has first and second surfaces joined by said first hole, said outer member has third and fourth surfaces joined by said outer hole, said inner hole is countersunk at the end at said second surface, said outer hole is countersunk at the end at said fourth surface, said bolt has a flat head adapted for snug fit in the countersunk portion of said second hole and said fastener also includes a bushing having an axial bore and a frusto-conical surface adapted for snug fit in the countersunk portion of said first hole and a bottom surface adapted to be flush with said second surface.

7. The invention set forth in claim 3 wherein said bolt has a head at one end and a flattened extension remote from said head adapted for engagement by a tool.

8. The invention set forth in claim 3 wherein said holes are of the same diameter, said shank has an unthreaded portion adapted for sliding fit in said holes and a threaded portion of smaller diameter than said unthreaded portion, said nut is adapted for threaded engagement with said threaded portion and means is provided for preventing said nut from passing through said first hole.

9. The invention set forth in claim 8 wherein said unthreaded shank portion has an annular recess therearound and said means comprises a split beveled snap ring of resilient material normally partly in said recess but compressible fully into said recess.

10. The invention set forth in claim 8 wherein said unthreaded shank portion has an annular recess therearound and said means comprises a split beveled snap ring of resilient material normally partly in said recess but compressible fully into said recess and said fastener further includes a shim having a bore of the same diameter as said holes and adapted for attachment to said inner member with said bore aligned with said first hole and a pressure cap having a closed end, an open end and a non-circular portion adjacent said open end, said cap adapted for attachment to the side of said shim remote from said inner member, and said retainer is adapted to be non-rotatably loosely contained in said cap within said non-circular portion and adjacent said shim.

References Cited in the file of this patent

UNITED STATES PATENTS

| | | |
|---|---|---|
| 2,095,271 | Swanstrom | Oct. 12, 1937 |
| 2,374,679 | Hallock | May 1, 1945 |
| 2,477,178 | Hallock | July 26, 1949 |
| 2,479,992 | Woods | Aug. 23, 1949 |
| 2,486,670 | Nigg | Nov. 1, 1949 |
| 2,552,779 | Griffin | May 15, 1951 |
| 2,640,244 | Becker | June 2, 1953 |
| 2,662,260 | Marschner | Dec. 15, 1953 |

FOREIGN PATENTS

| | | |
|---|---|---|
| 861,512 | France | Feb. 11, 1941 |

UNITED STATES PATENT OFFICE

CERTIFICATE OF CORRECTION

Patent No. 2,936,501                       May 17, 1960

Harold E. Koch

It is hereby certified that error appears in the printed specification of the above numbered patent requiring correction and that the said Letters Patent should read as corrected below.

Column 5, line 10, after "through" insert -- which --; column 8, line 24, for "volt" read -- bolt --.

Signed and sealed this 1st day of November 1960.

(SEAL)
Attest:

KARL H. AXLINE
Attesting Officer

ROBERT C. WATSON
Commissioner of Patents